(12) United States Patent
Kwon

(10) Patent No.: US 10,781,106 B2
(45) Date of Patent: Sep. 22, 2020

(54) METHOD FOR SEPARATING DETONATION NANODIAMONDS

(71) Applicant: NanoResource, Seoul (KR)

(72) Inventor: Myoungtaek Kwon, Seoul (KR)

(73) Assignee: NANORESOURCE, Seoul (KR)

( * ) Notice: Subject to any disclaimer, the term of this patent is extended or adjusted under 35 U.S.C. 154(b) by 627 days.

(21) Appl. No.: 15/529,084

(22) PCT Filed: Nov. 25, 2015

(86) PCT No.: PCT/KR2015/012705
§ 371 (c)(1),
(2) Date: May 24, 2017

(87) PCT Pub. No.: WO2016/085249
PCT Pub. Date: Jun. 2, 2016

(65) Prior Publication Data
US 2017/0355604 A1    Dec. 14, 2017

(30) Foreign Application Priority Data

Nov. 26, 2014 (KR) .................. 10-2014-0166749

(51) Int. Cl.
*C01B 32/28* (2017.01)
*C01B 32/25* (2017.01)
*B02C 19/18* (2006.01)
*B02C 23/10* (2006.01)
*B02C 23/36* (2006.01)

(52) U.S. Cl.
CPC .............. *C01B 32/28* (2017.08); *B02C 19/18* (2013.01); *B02C 23/10* (2013.01); *B02C 23/36* (2013.01); *C01B 32/25* (2017.08)

(58) Field of Classification Search
CPC ... B02C 19/18; B02C 2019/183; B02C 23/10; B02C 23/36; C01B 32/25; C01B 32/28
USPC ............................................................ 241/1
See application file for complete search history.

(56) References Cited

U.S. PATENT DOCUMENTS 9,603,870 B2 *   3/2017   Mortenson ............... A61K 9/08
2004/0113301 A1 * 6/2004  Burger ............... A61C 13/0003
                                                                264/16
(Continued)

FOREIGN PATENT DOCUMENTS

KR      10-2011-0093700           8/2011

OTHER PUBLICATIONS

Mochalin, V. N., Shenderova, O., Ho, D., & Gogotsi, Y. (2012). The properties and applications of nanodiamonds. Nature nanotechnology, 7(1), 11-23.

(Continued)

*Primary Examiner* — Faye Francis
*Assistant Examiner* — Smith Oberto Bapthelus
(74) *Attorney, Agent, or Firm* — GW Suh Patent Services

(57) ABSTRACT

Disclosed is a method for separating nanodiamond clusters synthesized by a detonation method having a size of 100 nm~1,000 nm into nanodiamonds of 100 nm or less—more specifically, into uniformly sized nanodiamonds in the range of 5 nm~50 nm, free of metal and alkaline impurities and ready to quantitatively attach functional groups on the surface of the nanodiamonds for applications such as thin film precursor materials, drug delivery systems and cosmetics compositions.

11 Claims, 8 Drawing Sheets

(56) References Cited

U.S. PATENT DOCUMENTS

| | | | |
|---|---|---|---|
| 2004/0144399 A1* | 7/2004 | McDermott | B08B 3/12 134/1 |
| 2007/0161740 A1* | 7/2007 | Wiese | B01F 17/0042 524/492 |
| 2008/0000505 A1* | 1/2008 | McDermott | B08B 3/12 134/105 |
| 2008/0051500 A1* | 2/2008 | Wiese | C08F 2/24 524/431 |
| 2009/0162853 A1* | 6/2009 | Clark | C12M 23/42 435/6.14 |
| 2011/0252713 A1* | 10/2011 | Chakraborty | B01J 3/062 51/298 |
| 2012/0034464 A1* | 2/2012 | Chakraborty | B82Y 30/00 428/402 |
| 2017/0355604 A1* | 12/2017 | Kwon | C01B 32/28 |

OTHER PUBLICATIONS

Xu, X. Y., Yu, Z. M., Zhu, Y. W., & Wang, B. C. (2004). Dispersion and stability of nanodiamond in clean oil. In Materials Science Forum (vol. 471, pp. 779-783). Trans Tech Publications.

Xu, X., Yu, Z., Zhu, Y., & Wang, B. (2005). Effect of sodium oleate adsorption on the colloidal stability and zeta potential of detonation synthesized diamond particles in aqueous solutions. Diamond and related materials, 14(2), 206-212.

Ho, D. N. (2010). Applications in biology and nanoscale medicine. Springer. Chapter 1, Section 1.2.2.1 pp. 9.

* cited by examiner

METHOD FOR SEPARATING DETONATION NANODIAMONDS

CROSS-REFERENCE TO PRIOR APPLICATIONS

This application is a national Stage Patent Application of PCT International Patent Application No. PCT/KR2015/012705, filed on Nov. 25, 2015 under 35 U.S.C. § 371, which claims priority of Korean Patent Application No. 10-2014-0166749, filed on Nov. 26, 2014, which is hereby incorporated by reference in its entirety.

BACKGROUND

Technical Field

The present invention relates to a method for separating nanodiamonds existing in a clustered state after detonation synthesis, the size of which is in the range of 100 nm~1000 nm and more specifically, 100 nm~500 nm and separating them in to particles under 100 nm in size.

Description of Related Art

Detonation Nanodiamonds (DND) was discovered in the Former Soviet Union in the 1960s, which is fairly early compared to the discovery of its modern day counterparts; the fullerenes, single wall carbon nanotubes (SWCNT), double wall carbon nanotubes (DWCNT), multi-wall carbon nanotubes (MWCNT) and nanofibers. At first, DND was classified as weapons technology and was therefore kept unknown to the outside world until two groundbreaking papers were published in international journals about the material.

The synthesis of nanodiamonds is performed under a reducing atmosphere of fluids, such as carbon dioxide ($CO_2$) or water ($H_2O$), in a tightly enclosed alloy chamber, where a mixture of 2,4,6-Trinitroletuene (TNT)/1,3,5-Cyclotrimethylenetrinitramine (Hexogen or RDX (Research Department Explosive)) in a specified ratio is used as the explosive.

In other words, when explosive TNT is mixed with the white crystalline non-aqueous explosive component RDX in a certain ratio, for instance in tens of weight percent, the instantaneous high-temperature, high-pressure condition that is created when the explosive mixture reacts leads to the formation of a diamond (sp3 hybridized) crystal nucleus made of carbon constituents of the composition. This nucleus grows to a certain size. In addition, singular or multiple functional groups composed of C, O, H, N exist on the surface of graphite (sp2 hybridized), which include functional groups such as COOH, —C═O, —$NH_2$, —CHO, —OH, —$NO_2$, —C—O—C—.

According to several studies, DND possess a very stable structure with almost no toxicity making them good for biocompatibility. In addition, DND have very small particle sizes of only several nm and high specific surfaces of 250 $m^2/g$~450 $m^2/g$, which is tens of hundreds of times larger than diamond. DND are also known to possess unique electrical, chemical and optical properties such as numerous hydrophilic functional groups on their surface. Lately promising studies for DND include providing a biomedical function by attaching a functional group to the surface of DND or by attaching a useful antibiotic medicinal function to the surface of DND as a drug delivery system. For such applications, nanodiamonds of high purity and uniform size are essential requirements.

However, there are some drawbacks. Since the explosion reaction of DND is very short and contraction occurs at the same time, individual diamond particles have a strong tendency to agglomerate making it very difficult to break them up and separate them into several smaller particle groups or clusters. Moreover, it is difficult to remove impurities that lie inside these clusters.

After DND crystal formation was introduced to the world by the Soviet Physicist Danilenko in 1963, it was not until 2002 that results on the possibility of separating DND to individual particles came to light. The most influential study was performed by Osawa, the renowned carbon scientist from Japan who was the first person to theoretically predict the existence of fullerenes. In 1997 Osawa obtained diamond clusters from a Russian research institute and succeeded in separating them using very powerful milling equipment. Osawa used Zirconia milling beads in his milling equipment and succeeded in separating 30 micrometer diamond clusters into smaller individual diamond particles. Ever since Osawa's work was published in 2002, many scientists have made various attempts to separate diamond clusters.

Vul et al. from the Ioffe Physical Technical Institute in St. Petersburg, Russia reported chemically separating diamond particles by adding metal ions or strong acids to the diamond clusters. Gogotsi of Drexel University attempted separating diamond particles using sugar and salt (NaCl). Further, there were attempts to develop methods using various metal compounds or metal salts of Fe, Na, K, Cl, I etc. to separate the diamond particles.

Further, according to studies of Xu X. et al. in the Material Science Forum Vol. 471-472, pp. 779-783 in 2004 and Diamonds and Related Materials 14 (2) pp. 206-212 in 2005, attempts were made to separate diamond particles by treating detonated diamond clusters with chloric acid, sulfuric acid and potassium permanganate followed by ultrasound treatment.

Notwithstanding the fore-mentioned attempts to separate diamond particles, it is well known that metal or halogen ions are introduced as impurities during the separation process and are adsorbed on the surface or interfaces of the tiny diamond particles, which are very difficult to remove. For example, the milling process that uses Zirconia beads is known to introduce a considerable amount of Zr impurity to the diamond particles which is very difficult to remove as described in Nature Technology Vol 7, January 2012 "The Properties and Applications of Nanodiamonds". In addition, according to D. N. Ho in "Nanodiamonds: Applications in Biology an Nanoscale Medicine", 2010, a milling process using heavy Zirconia beads not only leads to drawbacks of a low recovery rate of 50 g and a high amount of impurities reaching several weight percent of Zr but also difficulty in removing Zr even under strong acids.

According to Korean patent application No. 10-2011-0093700, NaOH or NaCl entering the mixture as impurities amounted to 0.7 wt. % Na when NaOH was applied and 0.54% Cl when NaCl was applied.

Due to its good biocompatibility, attempts to attach various medicinal substances or insulin on to the surface of nanodiamonds using a pH dependent mechanism date back to as early as 2009. To be able attach medicinal substances to the surface of nanodiamonds, it is important to control the amount of impurities. Only then can synthetic substances having covalent bonds be quantitatively formed. Therefore, there is a serious need to control impurity contents during the separation process of nanodiamonds.

SUMMARY OF INVENTION

Technical Problem

One of the aims of the present invention is to provide a solution to the aforementioned problems by separating DND particle clusters into single particle phase nanodiamonds and multiple particle phase nanodiamonds without introducing impurities such as metal.

The present invention provides a method of separating clustered nanodiamonds into particles sizes of 100 nm or less without having to use metals (e.g. Zr), metal compounds, halogens, ceramics or metal salts.

The present invention provides a method of obtaining nanodiamonds having a particle size of 100 nm or less (average particle size: 5-50 nm) that are free of impurities or any combinations.

Technical Solution

One aspect of the current invention comprises the steps of:
hydrating a nanodiamond cluster in deionized water;
adding alcohol to the above solution to obtain a mixed aqueous solution;
applying ultrasound to the mixed aqueous solution to separate the nanodiamonds.

Advantageous Effects

The nanodiamonds separation method of the present invention solves the conventional problem of introduction of metal impurities because it does not involve using strong inorganic acids (e.g. $H_2SO_4$, $H_2CrO_4$, HCl, HI etc.) or strong bases containing alkaline, alkaline earth metals or transition metals.

In addition, according the separation method of the present invention, one can obtain a dispersion of single particle phase nanodiamonds in the size range of 5~50 nm along with multiple particle phase nanodiamonds.

The particle size of nanodiamonds of the present invention is fairly uniform and in the range of 5 nm~50 nm. By inhibiting the introduction of metal and alkaline impurities, it becomes feasible to quantitatively attach functional groups to the surface of the nanodiamonds for applications such as precursors for thin films in the IT industry, drug delivery systems and cosmetics compositions.

DETAILED DESCRIPTION OF THE INVENTION

Best Mode

The present invention relates to a method for separating nanodiamond clusters produced by detonation synthesis from a cluster size of hundreds of nanometers to sizes in the range of several to several tens of nanometers. The present invention also relates to nanodiamonds and nanodiamond dispersion solutions produced by the same method.

Figure 1A:
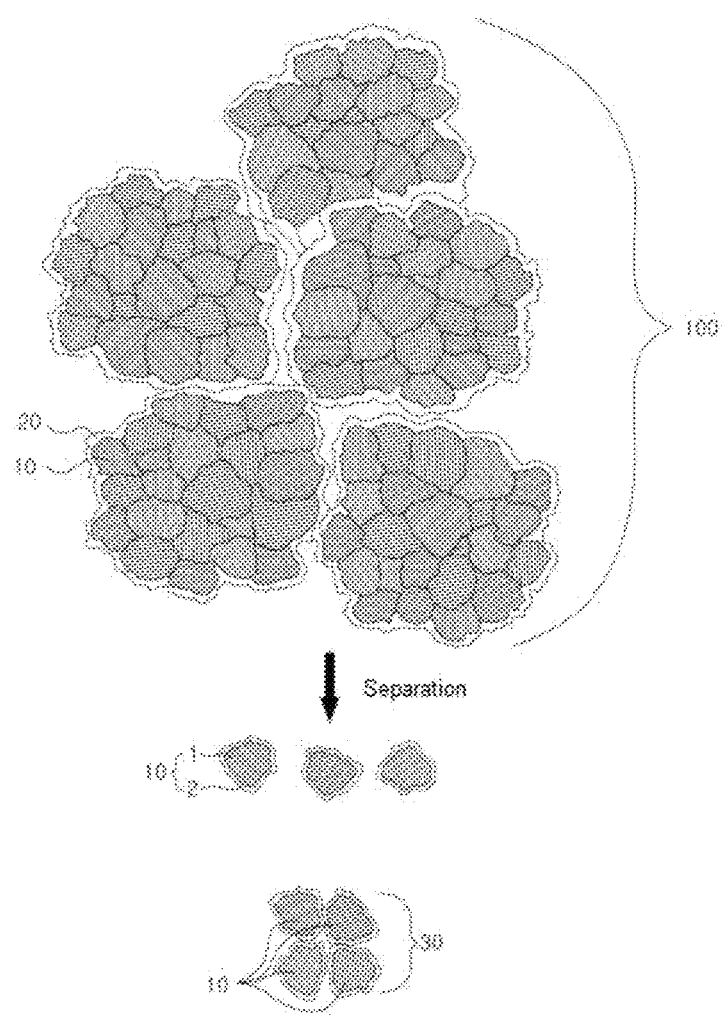
FIG. 1A shows a conventional method of separating nanodiamonds using milling.

FIG. 1A shows the method of separating nanodiamonds using the conventional technology of milling. FIG. 1A shows an example of a nanodiamond aggregate 100 formed by an explosion reaction and a single particle phase nanodiamond 10 and a cluster nanodiamond 30 separated therefrom. A thin graphite layer (2) commonly surrounds a diamond crystal structure at the core (1).

The cluster of detonation nanodiamond (DND) (100) as defined in the present invention refers to an agglomeration of tens to hundreds of single particle phase (10) nanodiamonds.

Multiple particle phase nanodiamonds (30) as defined in the present invention refers to a size of nanodiamonds that is in between single particle phase (10) nanodiamonds and a DND cluster (100) as shown in FIG. 1. For example, several single particle phase nanodiamonds (10) and preferably up to ten single particle phase nanodiamonds are referred to as multiple particle phase nanodiamonds (30) for the purposes of the present invention.

Figure 1B:
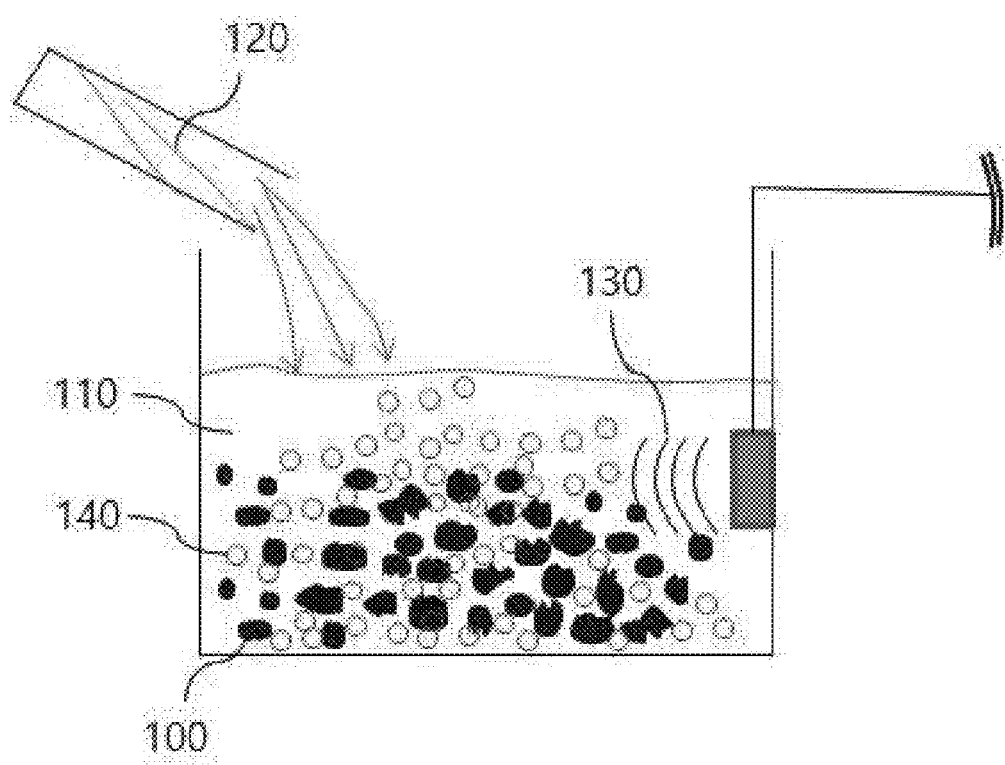
FIG. 1B illustrates the method of separating nanodiamonds according to the instant invention.
Figure 2:
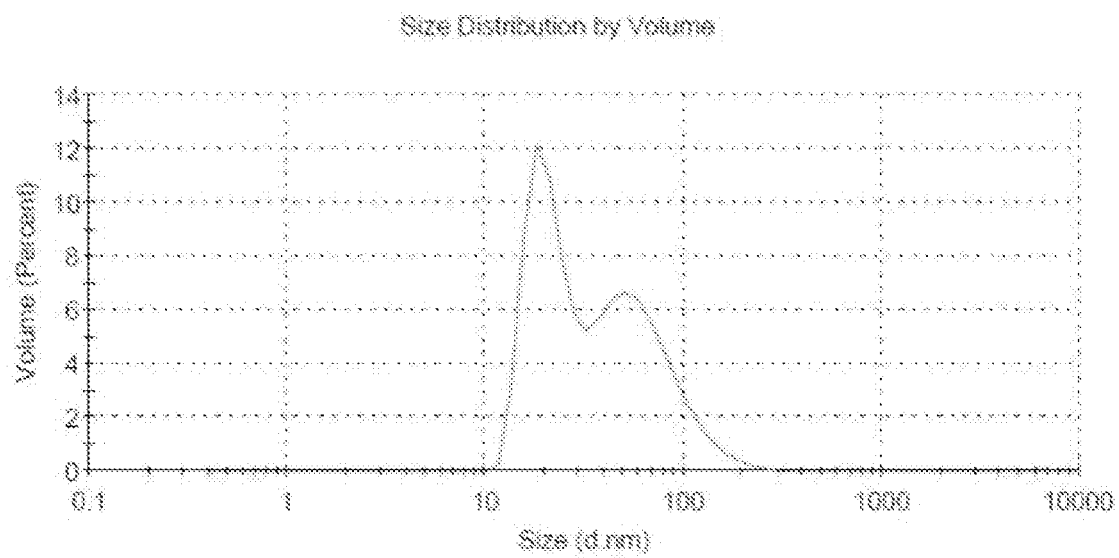
FIGS. 2-13 show results of particle analysis of nanodiamonds in dispersion solutions according to Examples 1~8 and Comparative Examples 1~4.
Figure 3:
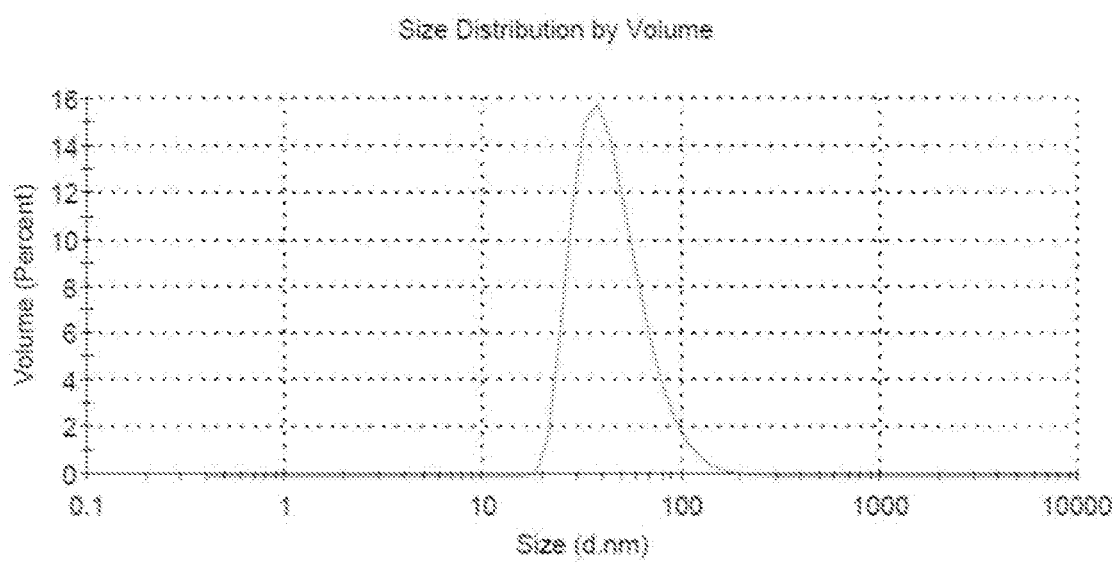
Figure 4:
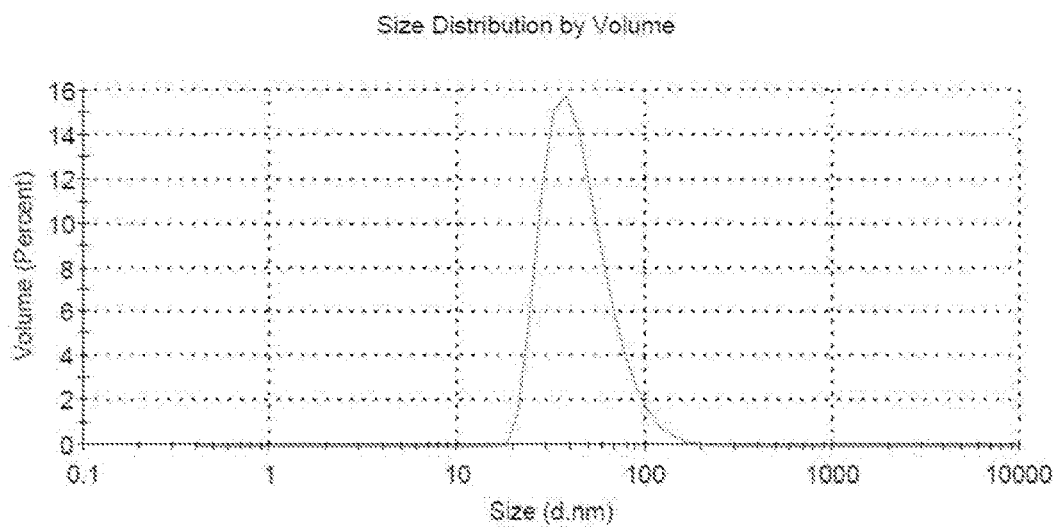
Figure 5:
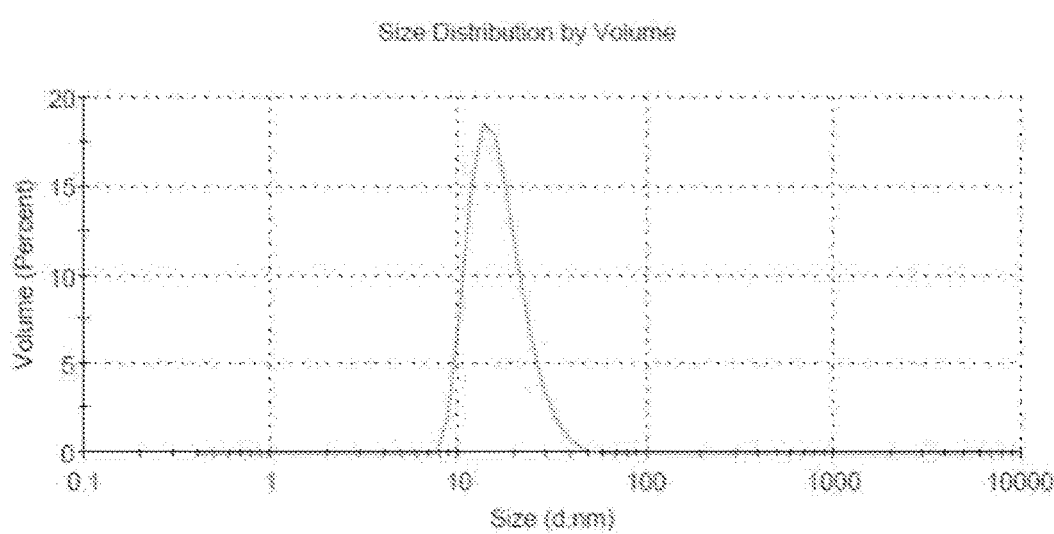
Figure 6:
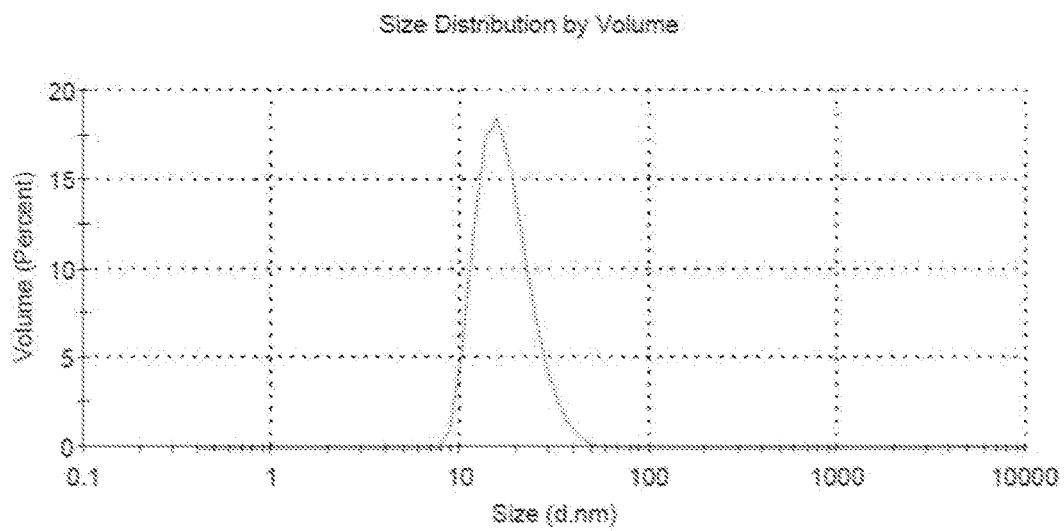
Figure 7:
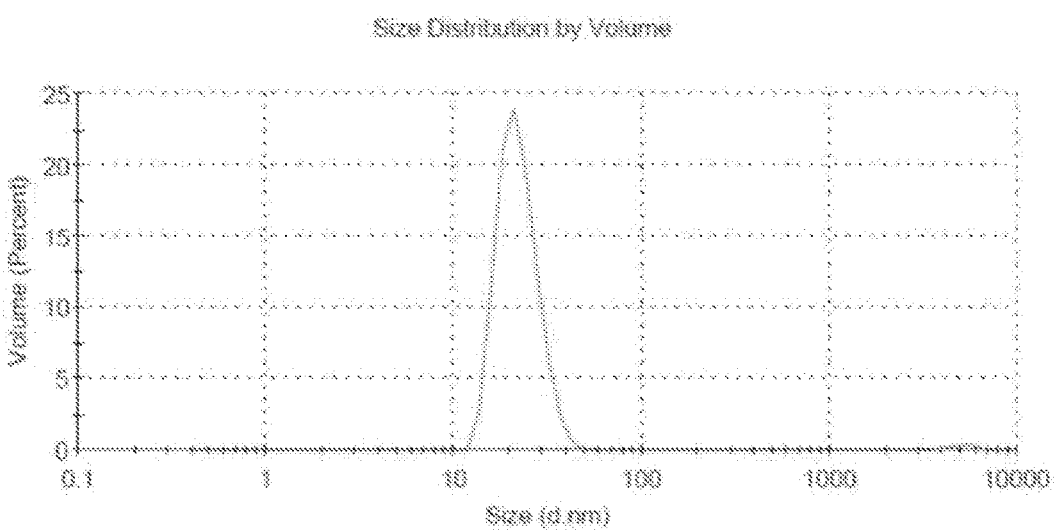
Figure 8:
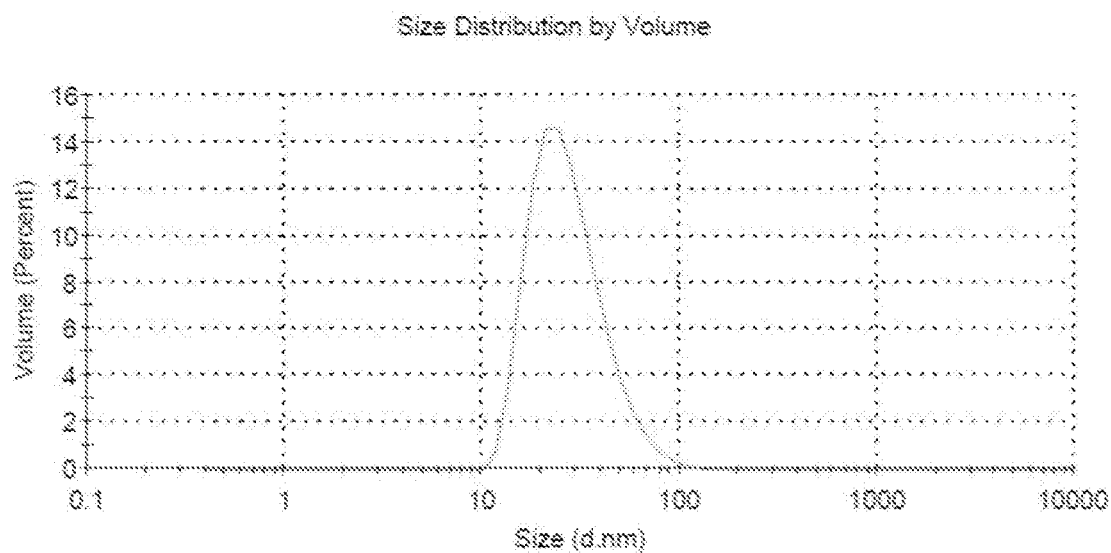
Figure 9:
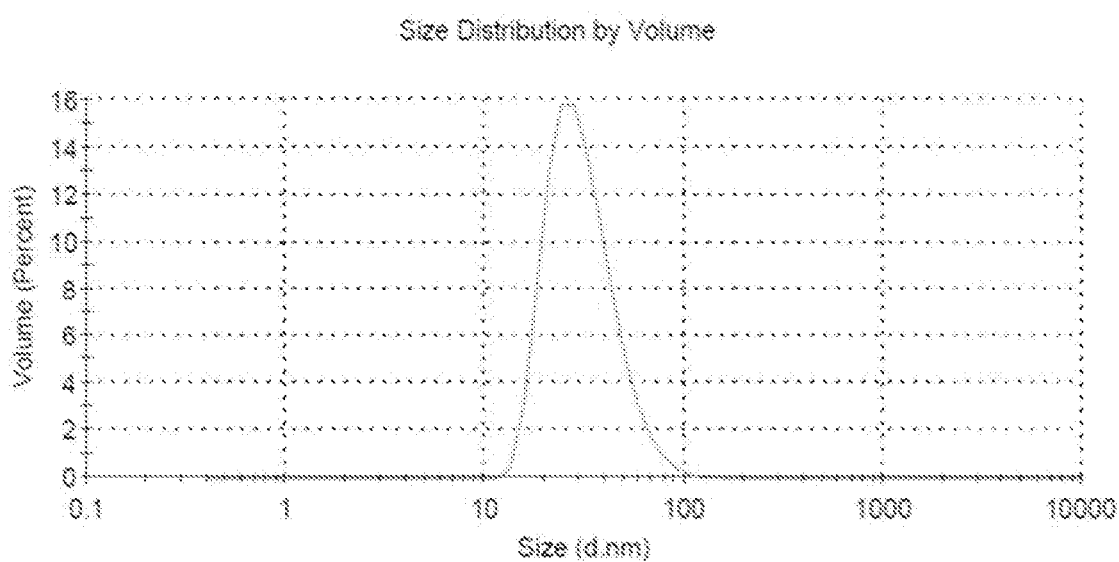
Figure 10:
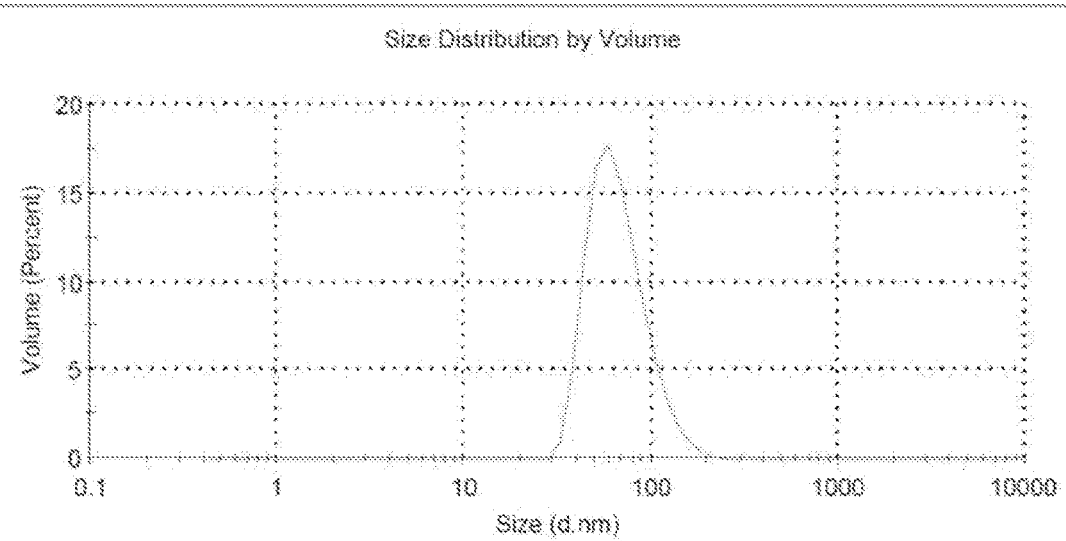
Figure 11:
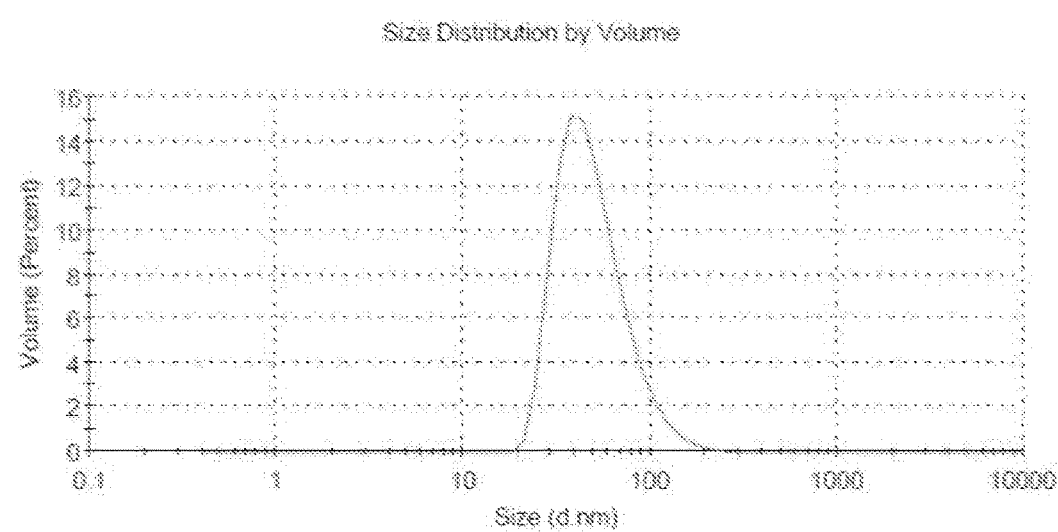
Figure 12:
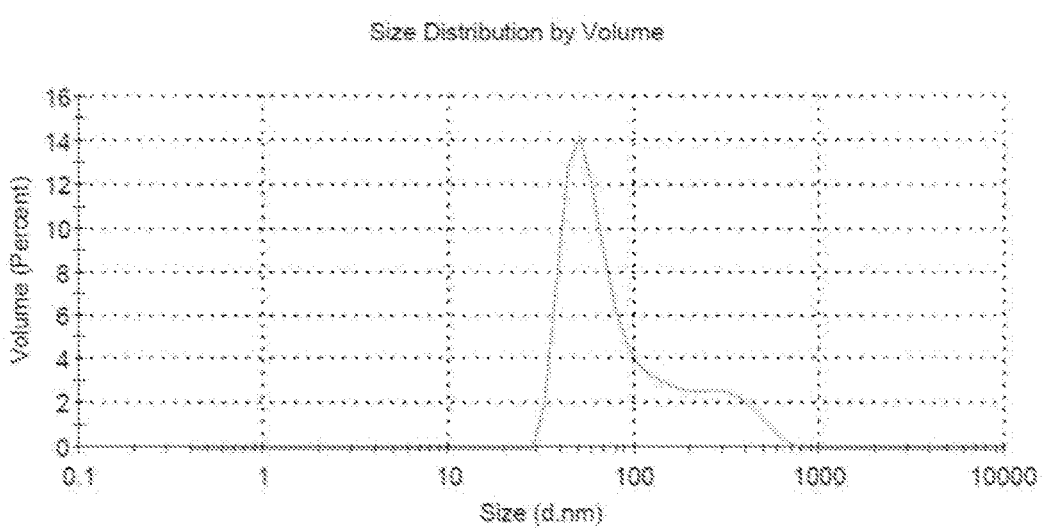
Figure 13:
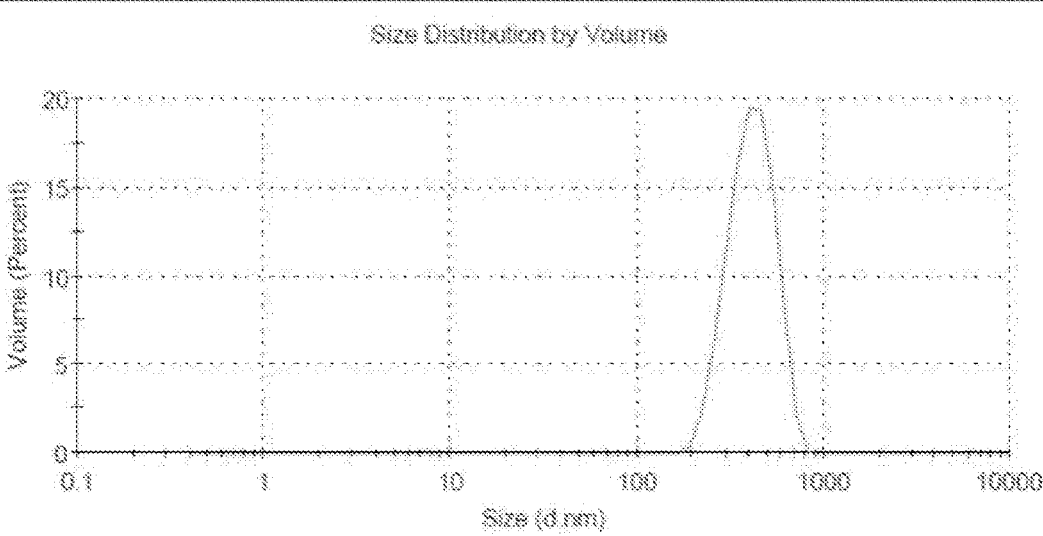

FIG. 1B shows a method of separating nanodiamonds according to the instant invention. Referring to FIG. 1B, the separation method shows the step of adding alcohol (120) to the solution of deionized water (110) containing detonated nanodiamond clusters (100), after which ultrasound (130) treatment is applied to assist breaking up the nanodiamond clusters (100) via cavitation (140). It will be well understood by a person having ordinary skill in the art that the dimensions depicted in the figure are not necessarily in scale or due proportion.

The present invention provides a method for separating and removing the graphite layer (20) from the surface of the nanodiamond clusters (100) and a method for separating the agglomerated nanodiamonds into individual single particle phase nanodiamonds (10) and multiphase nanodiamonds (30).

The separation method of the present invention includes a hydration step, a solvent mixture step and a separation step. The method may also include a pH control step and a recovery step for the nanodiamond particles.

The hydration step involves adding the nanodiamond cluster (100) in to deionized water and hydrating it. Here, the nanodiamond cluster refers to the soot produced as a result of the detonation synthesis. The preferred diamond content of the soot is 10%~90%. It is also possible to include a process for eliminating carbon and graphite formed on the surface of the nanodiamond cluster although it is not necessarily required.

The nanodiamonds being subject to the hydration process are DND cluster powders synthesized by detonation as previously described. There is no limit to the size of the powders and it may be in the range of 500 nm~1000 nm.

The duration required for the hydration step may be 10~100 minutes, and may preferably be 30~60 minutes. The hydration may be performed at a temperature in the range of 30~100° C. and preferably in the range of 60~80° C.

The weight of the nanodiamond cluster being added to the solution may be 0.1~20 parts by weight based on 100 parts of deionized water and may preferably be 1~10 parts by weight based on 100 parts of deionized water.

As a result of the hydration process described above, water molecules permeate into the DND cluster (100) and in-between the single particle phase nanodiamonds (10), sufficiently wetting them.

The step of adding alcohol is performed by adding alcohol directly to the hydrated nanodiamond solution.

Commonly known alcohols, for example, alkyl alcohol, ethyl alcohol, propyl alcohol as well as dihydric and trihydric alcohols etc. may be used in the alcohol adding step described above.

It is preferable to use alcohols having a boiling point that is lower than water and more preferably at least one of methyl alcohol, ethyl alcohol and propyl alcohol or a combination thereof.

The proportion of alcohol added to the solution may be 1:0.1~10 (deionized water:alcohol) and preferably 1:0.5~10 (deionized water:alcohol).

The present invention may include the step of applying ultrasound to the solution after adding a solvent to the mixture.

The applied ultrasound may have a frequency of 2 kHz~40 kHz.

The power of the applied ultrasound may be in the range of 100 W~2000 W, and more specifically in the range of 500 W~1500 W. The duration of ultrasound application may be in the range of 1 hr~10 hrs and preferably in the range of 3 hrs~6 hrs.

The temperature of the solution during ultrasound application may be in the range of 30~100° C. and preferably in the range of 70~90° C. The pressure within the reaction chamber may be maintained in the range of 1~100 atmospheres and more specifically in the range of 1~10 atmospheres.

The solution may be stirred while applying the ultrasound.

Cavitation caused by the ultrasound increases the boiling effect of the mixed solution of water and alcohol thereby facilitating the break-up of the nanodiamond cluster (100).

Specifically, water and alcohol molecules that permeate into the crevices of the DND cluster start to form bubbles under the influence of ultrasound. In addition, alcohol rapidly evaporates at the boiling point of the mixed water-alcohol solution adding to the bubbling effect of the ultrasound. The combined effects of the boiling solvent and the ultrasound create high energy bubbles packed with powerful impact forces inside the DND clusters (100) that break them up and separate them from within.

There were many previous attempts to employ ultrasound to break up DND clusters (100). However, relying solely on ultrasound required more time and did not have a significant effect.

The pH of the mentioned solution may be raised to a value in the range of 3~12 and preferably in the range of 5~12. More specifically, alkaline agents may be added to the solution to control its pH before, during or after applying the ultrasound. Alternatively, acids may be added to the solution to control its pH. For such purposes, it is desirable to use inorganic or organic acids that are free of metal or halogen elements. For example, $H_2SO_4$ may be used.

As for alkaline agents, a non-metallic base, and preferably an amine base alkaline agent may be used. Among the amine based alkaline agents, $NH_4OH$ ($NH_3$) is the most preferable. The reason for $NH_4OH$ being most preferable is because $NH_3$ is highly soluble in water and it has the advantage of being easy to add to or remove from water. In addition, the following energy scheme is realized on the surface of the nanodiamond cluster: First, H is dissociated from COOH existing on the surface of the nanodiamond (ND) cluster to give ND-COO—+H+. As the pH of the solution is gradually increased from acidic to neutral and then to alkaline, the surface of the nanodiamond cluster maintains an absolute value of zeta potential that remains above a certain level due to the characteristics of ND-COO—, and therefore puts the nanodiamond cluster in a state that is easier to break up.

Eventually, by adding the alkaline agent, it is possible to significantly prevent the re-agglomeration of the single particle phase (10) nanodiamonds having COOH functional groups on its surface.

As a result of adding the alkaline agent to the solution, the zeta potential value of the solution may fall in the range of −100~100 mV and preferably in the range of −50~50 mV.

In the initial particle separation stage of the present invention, the inclusion of metal components as well as highly reactive halogen ion compounds has been prevented. Only those non-metallic compounds, such as $H_2O$, EtOH, MeOH, $NH_4OH$, $CH_3COOH$ etc., that are basically composed of the same elements (substances) that compose DND (C, H, O, N) have been used because they are compounds made up of substances that do not remain in the system before and after the reaction. In addition, ultrasound is applied as an auxiliary means to increase the efficiency of the overall separation while adding the alkaline agent contributes to maintaining the distance between the separated particles.

Repeating the series of steps of the present invention causes the separated particles to become continuously smaller and the color of the separated dispersions to turn from the initial gray (approximately 200 nm or more) to blue (200 nm~100 nm) and further to black (100 nm or less) that is transparent and has no turbidity. Eventually, transparent nanodiamonds with particle sizes 100 nm and less are obtained. Further, the separated particle size may reduce to 50 nm or less and ultimately converge to the level of 5 nm.

The described method of the present invention may comprise additional steps after the step of applying ultrasound that include a step of separating the nanodiamonds from the solution and a step of drying.

After the ultrasonic step, a separation and drying step which may involve centrifugation or vacuum distillation and high temperature spray drying or oven drying may result in the recovery of separated nanodiamond particles in its solid phase.

The steps of the present invention may be repeated in series at least once. In addition, the recovered nanodiamond powders may be used industrially by mixing with other solids, liquids or gases.

Another aspect of the present invention relates to the nanodiamonds produced by the steps described herein. The average particle size of the nanodiamond powder may be 100 nm or less, and preferably in the range of 5~50 nm.

The present invention also relates to the dispersion of the mentioned nanodiamond powders dispersed in water or other solvents. The dispersion has the features of changing color depending on the concentration of the solution. The results of UV/VIS spectroscopy on the nanodiamonds obtained may be as follows.

Mode of Invention

The description above may be explained by the following test procedures and results.

Example 1

Approximately 200 g of nanodiamond clusters synthesized by the detonation reaction method was added to 4 L of deionized water and stirred for 60 minutes while heating the solution up to 80° C. 400 mL of ethanol was added to the solution and stirred for approximately 10 more minutes. NH$_4$OH was then added to the solution increasing the pH of the solution to a value of 8 or above. Thereafter, ultrasonic treatment was performed for 120 minutes on the solution with a frequency of 2~4 kHz. The recovered particle slurry was then subject to centrifugation for separation at 10,000 rpm for 30 minutes. The particle distribution of the separated diamond particles is listed in the following Table 1.

Example 2

Approximately 200 g of nanodiamond clusters synthesized by the detonation reaction method was added to 3 L of deionized water and stirred for 60 minutes while heating the solution up to 80° C. 1 L of EtOH was added to the solution and then NH$_4$OH was added to raise the pH value of the solution to 8 or more, after which ultrasonic treatment was performed for 120 minutes at a frequency of 2~4 kHz. The resulting particle slurry was then subject to centrifugation for separation. The speed of the centrifuge was 10,000 rpm for 1 hr.

Example 3

200 g of nanodiamond clusters synthesized by the detonation reaction method was added to 2 L of deionized water and stirred for 60 minutes at room temperature. 2 L of EtOH was added to the solution and then NH$_4$OH was added to raise the pH value of the solution to 8 or more, after which ultrasonic treatment was performed for 120 minutes at a frequency of 2~4 kHz. The resulting particle slurry was then subject to centrifugation for separation. The speed of the centrifuge was 10,000 rpm for 60 minutes. The particle distribution of the separated diamond particles is listed in the following Table 1.

Example 4

200 g of nanodiamond clusters synthesized by the detonation reaction method was added to 1 L of deionized water and stirred for 60 minutes while heating the solution up to 80° C. 3 L of EtOH was added to the solution and then NH$_4$OH was added to raise the pH value of the solution to 8 or more, after which ultrasonic treatment was performed for 240 minutes at a frequency of 2~4 kHz. The resulting particle slurry was then subject to centrifugation for separation. The speed of the centrifuge was 10,000 rpm for 2 hours. The particle distribution of the separated diamond particles is listed in the following Table 1.

Example 5

200 g of nanodiamond clusters synthesized by the detonation reaction method was added to 2 L of deionized water and stirred for 60 minutes while heating the solution up to 80° C. 2 L of EtOH was added to the solution and then NH$_4$OH was added to raise the pH value of the solution to 8 or more, after which ultrasonic treatment was performed for 240 minutes at a frequency of 2~4 kHz. The resulting particle slurry was then subject to centrifugation for separation. The speed of the centrifuge was 10,000 rpm for 2 hours. The particle distribution of the separated diamond particles is listed in the following Table 1.

Example 6

200 g of nanodiamond clusters synthesized by the detonation reaction method was added to 3 L of deionized water and stirred for 60 minutes while heating the solution up to 80° C. 1 L of EtOH was added to the solution and then NH$_4$OH was added to raise the pH value of the solution to 8 or more, after which ultrasonic treatment was performed for 240 minutes at a frequency of 2~4 kHz. The resulting particle slurry was then subject to centrifugation for separation. The speed of the centrifuge was 10,000 rpm for 2 hours. The particle distribution of the separated diamond particles is listed in the following Table 1.

Example 7

200 g of nanodiamond clusters synthesized by the detonation reaction method was added to 2 L of deionized water and stirred for 60 minutes while heating the solution up to 80° C. 2 L of EtOH was added to the solution and then NH$_4$OH was added to raise the pH value of the solution to 8 or more, after which ultrasonic treatment was performed for 240 minutes at a frequency of 2~4 kHz. The resulting particle slurry was then subject to centrifugation for separation. The speed of the centrifuge was 10,000 rpm for 1 hour. The particle distribution of the separated diamond particles is listed in the following Table 1.

Example 8

200 g of nanodiamond clusters synthesized by the detonation reaction method was added to 3 L of deionized water and stirred for 60 minutes while heating the solution up to 80° C. 1 L of methanol was added to the solution and then NH$_4$OH was added to raise the pH value of the solution to 8 or more, after which ultrasonic treatment was performed for 240 minutes at a frequency of 2~4 kHz. The resulting particle slurry was then subject to centrifugation for separation. The speed of the centrifuge was 10,000 rpm for 1 hour. The particle distribution of the separated diamond particles is listed in the following Table 1.

Comparative Example 1

200 g of nanodiamond clusters synthesized by the detonation reaction method was added to 4 L of deionized water and stirred for 60 minutes while heating the solution up to 80° C. NaOH was then added to the solution increasing the pH of the solution to a value of 8 or above. Thereafter, ultrasonic treatment was performed for 240 minutes on the solution with a frequency of 2~4 kHz. The recovered particle slurry was then subject to centrifugation for separation at 10,000 rpm for 1 hour. The particle distribution of the separated diamond particles is listed in the following Table 1.

Comparative Example 2

200 g of nanodiamond clusters synthesized by the detonation reaction method was added to 4 L of deionized water and stirred for 60 minutes while heating the solution up to 80° C. NaCl and NaOH were then added to raise the pH value of the solution to 8 or more, after which ultrasonic treatment was performed for 240 minutes at a frequency of 2~4 kHz. The resulting particle slurry was then subject to centrifugation for separation. The speed of the centrifuge was 10,000 rpm for 1 hour. The particle distribution of the separated diamond particles is listed in the following Table 1.

Comparative Example 3

200 g of nanodiamond clusters synthesized by the detonation reaction method was added to 4 L of deionized water and stirred for 60 minutes while heating the solution up to 80° C. NaCl and NaOH were then added to raise the pH value of the solution to 8 or more, after which ultrasonic treatment was performed for 120 minutes at a frequency of 2~4 kHz. The resulting particle slurry was then subject to centrifugation for separation. The speed of the centrifuge was 10,000 rpm for 1 hour. The particle distribution of the separated diamond particles is listed in the following Table 1.

Comparative Example 4

200 g of nanodiamond clusters synthesized by the detonation reaction method was added to 4 L of deionized water and stirred for 60 minutes while heating the solution up to 80° C. The solution was then subject to ultrasonic treatment for 60 seconds. The particle distribution of the separated diamond particles is listed in the following Table 1.

Measurement of Particle Size Distribution

Measurement of particle size distribution of the nanodiamond particles separated from the nanodiamond clusters was performed using a Malvern Zetasizer® on the dispersion solutions of Examples 1~8 (FIGS. 2-9) and Comparative Examples 1~4 (FIGS. 10~13) and are graphically shown in FIGS. 2-13 and listed in Table 1 below.

In Comparative Examples 1~4, only water was used as the solvent and as a result, the particle size distribution was 30~850 nm and the average particle size was 85~488 nm, indicating that the nanodiamond particles did not separate completely from the nanodiamond clusters.

While the present invention has been particularly shown and described with reference to exemplary embodiments as given above, they are for purposes of illustration only and are not intended to limit the scope of protection of the present invention.

INDUSTRIAL APPLICATIONS

The method for separating nanodiamonds of the present invention provides nanodiamond particles of 5~50 nm, which are uniform in size and absent of metal or alkaline impurities and therefore may be used as precursor materials for thin films, drug delivery systems or cosmetic compositions and the like.

What is claimed is:

1. A method for separating nanodiamond clusters comprising the steps of:
   adding nanodiamond clusters to deionized water;
   adding alcohol to the deionized water to form a mixed aqueous solution;

TABLE 1

| Example No. | Average Particle Size (nm) | Median Size (nm) | Particle Size Distribution (nm) | Color of Particle | Impurities |
|---|---|---|---|---|---|
| Example 1 | 90 | 66.1 | 10~300 | Gray | Not applicable |
| Example 2 | 65 | 46.6 | 18~180 | Blackish gray | Not applicable |
| Example 3 | 61 | 47.2 | 18~160 | Blackish gray | Not applicable |
| Example 4 | 23 | 18.0 | 7~60 | Black | Not applicable |
| Example 5 | 21 | 16.8 | 5~50 | Black | Not applicable |
| Example 6 | 28 | 22.3 | 13~70 | Black | Not applicable |
| Example 7 | 43 | 29.1 | 10~120 | Black | Not applicable |
| Example 8 | 43 | 32.1 | 15~130 | Black | Not applicable |
| Comparative Example 1 | 85 | 68.7 | 30~230 | Brownish gray | Na |
| Comparative Example 2 | 75 | 52.1 | 20~220 | Blackish gray | Na |
| Comparative Example 3 | 174 | 76.6 | 30~700 | Black-gray | Cl |
| Comparative Example 4 | 488 | 419.7 | 170~850 | Gray | Not applicable |

Referring to Table 1, Examples 1~8 list an average particle size of 120 nm or less, and for Examples 2~8 the average size is in general about 50 nm. Examples 4~8 in particular, show a particle size distribution of 100 nm or less and a very small average particle size of 20~50 nm, which are black in color. In general, the color of the dispersion solution of nanodiamonds is gray for particles of 200 nm or more, blue for particles of 100~200 nm and clear black with no turbidity for particles of 100 nm or less. The majority of the examples given in the present invention display a color of black or blackish gray which confirms that the nanodiamond particles separated and dispersed are of 100 nm or less in size.

Due to the metal additives, it can be seen that impurities such as Na and Cl exist in Comparative Examples 1~3. For Comparative Example 1, as much as 0.7 wt. % was detected. Through the given examples, it was confirmed that nanodiamonds could be separated without the use of zirconium or ceramic beads or the use of metal containing compounds (e.g. NaCl). In addition, as shown in Examples 1~8 since there was no introduction of Na during the separation process of the nanodiamonds the impurity content was nil.

applying ultrasound to the mixed aqueous solution to separate the nanodiamond cluster,
wherein the boiling point of the alcohol is lower than that of the water,
wherein the mixed aqueous solution is maintained at a temperature of 30~100° C.,
wherein cavitation caused by the ultrasound increases the bubbling effect of the mixed aqueous solution, thereby facilitating the break-up of the nanodiamond clusters.

2. The method according to claim 1, wherein the nanodiamond clusters are added to the deionized water in the ratio of 0.1~20 parts per weight of nanodiamond clusters to 100 parts per weight of deionized water.

3. The method according to claim 1, wherein the volume ratio of the deionized water to the alcohol is 1:0.1~10.

4. The method according to claim 1, further comprising a pH controlling step comprised of adding an alkaline agent or an acid to the mixed aqueous solution before, during or after the step of applying ultrasound to the mixed aqueous solution.

5. The method according to claim 4, wherein the acid is an inorganic acid or an organic acid free of metal or halogen elements.

6. The method according to claim 4, wherein the mixed aqueous solution has a pH value within the range of 3~12.

7. The method according to claim 4, wherein the alkaline agent is a non-metallic base.

8. The method according to claim 4, wherein the alkaline agent is a non-metallic amine base.

9. The method according to claim 4, wherein the mixed aqueous solution comprises a zeta potential value in the range of −100~100 mV as a result of adding the alkaline agent.

10. The method according to claim 1, wherein the applied ultrasound has a frequency in the range of 2 kHz~40 kHz.

11. The method according to claim 1, further comprising the step of recovering the nanodiamond particles by centrifugation after the step of applying ultrasound to the mixed aqueous solution.

\* \* \* \* \*